United States Patent [19]
McDougal

[11] 3,907,431
[45] Sept. 23, 1975

[54] MAGNETIC HEADING REFERENCE

[76] Inventor: John A. McDougal, 2314 E. Court St., Flint, Mich. 48503

[22] Filed: Nov. 19, 1973

[21] Appl. No.: 416,741

[52] U.S. Cl. ............... 356/114; 250/225; 356/141; 356/152
[51] Int. Cl.² .................. G01J 4/00; G01N 21/40
[58] Field of Search .......... 356/114, 141, 150, 152; 250/225

[56] References Cited
UNITED STATES PATENTS

| | | | |
|---|---|---|---|
| 2,952,779 | 9/1960 | Talley | 356/152 X |
| 3,306,159 | 2/1967 | Beall, Jr. et al. | 356/114 X |
| 3,373,499 | 3/1968 | Rothe et al. | 356/138 X |
| 3,474,255 | 10/1969 | White | 356/114 X |
| 3,567,327 | 3/1971 | Gerard | 356/152 |
| 3,617,761 | 11/1971 | Cooper, Jr. | 250/225 |
| 3,723,011 | 3/1973 | Allen | 250/225 |
| 3,804,522 | 4/1974 | Smith et al. | 250/225 |

Primary Examiner—Saxfield Chatmon, Jr.
Attorney, Agent, or Firm—Harness, Dickey & Pierce

[57] ABSTRACT

A magnetic compass disc acts as a source of polarized light whose direction of polarization aligns with the prevailing external magnetic field. The polarized light falls on an analyzing disc having central and outer polarized regions whose respective directions of polarization are at an angle to each other. A pair of photo-responsive elements are disposed to respectively receive polarized light passing respectively through the central region of the analyzing disc and through the outer region of the analyzing disc. As the orientation of the analyzing disc changes with respect to the orientation of the compass disc, the photo-responsive elements provide output signals indicative of the angular orientation of the analyzing disc with respect to the polarizing disc. The photo-responsive elements are connected in a bridge circuit which provides an output signal representative of the difference between the signals provided by the two photo-responsive elements.

28 Claims, 4 Drawing Figures

US Patent   Sept. 23, 1975   3,907,431
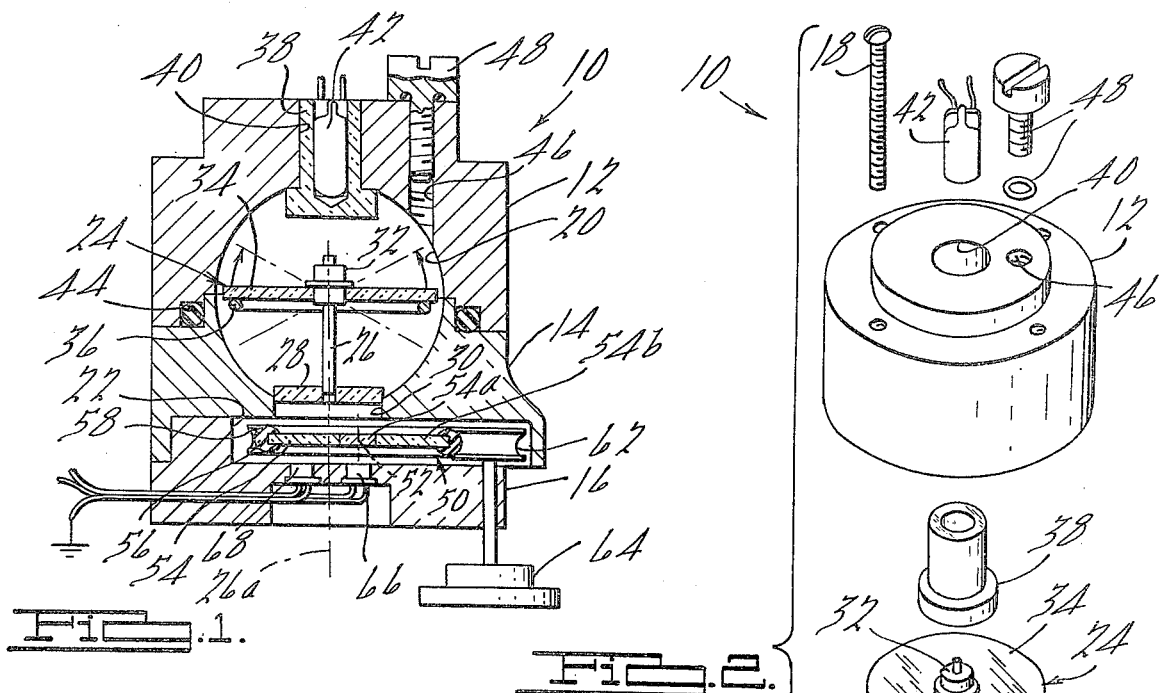
FIG.1.
FIG.2.
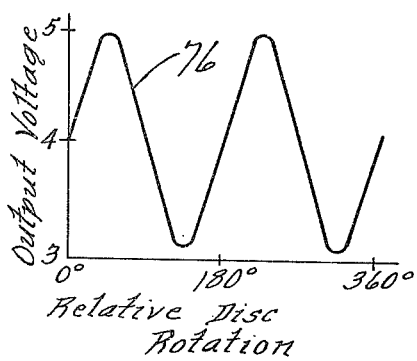
FIG.3.
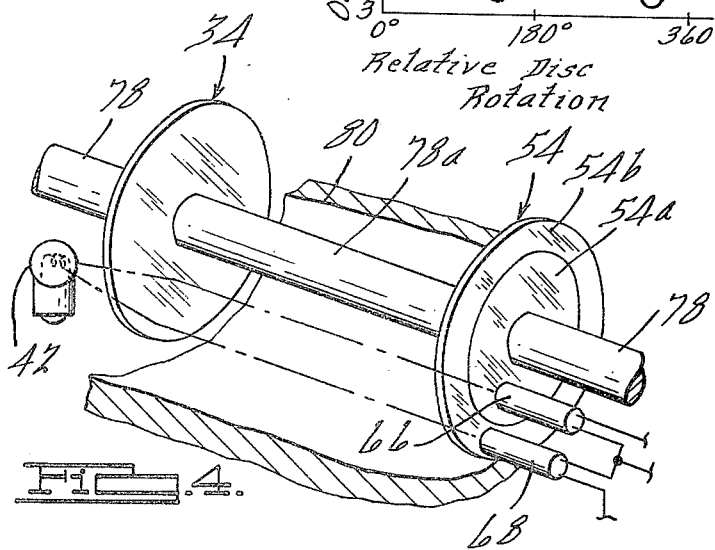
FIG.4.
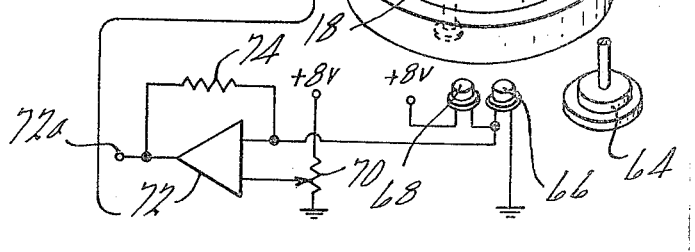

MAGNETIC HEADING REFERENCE

BACKGROUND AND SUMMARY OF THE INVENTION

The present invention pertains to a magnetic heading reference employing a polarized light system.

Although the broad concept of employing a polarized light system in a magnetic heading reference, of the type commonly used in an auto-pilot, is already known, the present invention is directed to improvements in polarized light systems which provide important advantages and benefits in connection with a magnetic heading reference. A system pursuant to the present invention attains improved operating performance without the complexity associated with prior art polarizing systems. The improvements in the polarized light systems afforded by the present invention furthermore provide additional advantages in a magnetic heading reference. With the present invention, inexpensive diffuse light sources can be used; polarizing and analyzing elements can be spaced far apart without using complex optically collimated light beams or light shields; the axis of the polarizing and analyzing elements can be offset with respect to each other; photo-responsive elements can be positioned side-by-side and eccentrically located with respect to the axis of the analyzing element thereby minimizing radial dimensions; the polarizing element can tilt in any direction about its axis, and this is especially beneficial in a magnetic heading reference; the photo-responsive elements are associated with respective polarized regions of the analyzing element to receive substantially only light passing through the respective associated polarized region of the analyzing element; the analyzing element can be conveniently positioned to any desired setting in accordance with magnetic direction; and high accuracy can be attained.

The foregoing features of the invention, along with additional advantages and benefits thereof, will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated for carrying out the invention.

FIG. 1 is a vertical longitudinal sectional view through a magnetic heading reference embodying principles of the present invention.

FIG. 2 is an exploded perspective view of the magnetic heading reference of FIG. 1 including an electrical schematic diagram of a circuit operatively associated with the magnetic heading reference.

FIG. 3 is a graph useful in explaining the operation of the magnetic heading reference.

FIG. 4 is a perspective diagramatic view illustrating principles of the present invention in a further application of the invention.

DESCRIPTION OF THE PREFERRED EMBODIMENT

In FIGS. 1 and 2 a magnetic heading reference 10 according to the present invention comprises a three-piece housing composed of an upper hemispherical housing element 12, a lower hemispherical housing element 14 and an analyzer housing element 16. The three housing elements 12, 14 and 16 are preferably made from an opaque material and are secured together by a plurality of fasteners 18 only two which are illustrated in the drawing FIG. 2. Housing elements 12 and 14 define therebetween a spherical compass disc enclosure 20 while housing elements 14 and 16 define therebetween a shallow cylindrical analyzing disc enclosure 22. A magnetic compass disc 24 is centrally supported within enclosure 20 on an upright post 26 which is centrally affixed to a circular transparent plastic window 28 inserted into a circular hole 30 extending through the bottom of housing element 14 between enclosures 20 and 22. A conventional compass jewel and pivot 32 supports disc 24 on post 26 for rotational movement about the axis 26a defined by post 26. Furthermore, disc 24 is free to tilt in any plane about axis 26a, as is illustratively indicated in broken lines in FIG. 1. A circular polarizing disc 34 is affixed to jewel and pivot 32, and a magnet 36, preferably a cunife ring magnet, is affixed to disc 34. A transparent lamp housing 38 mounts in a hole 40 in upper housing element 12 at the top of enclosure 20. A lamp 42 is contained within housing 40 and need be only an inexpensive diffuse light source. An O-ring seal 44 lodges in a suitable groove between housing members 12 and 14 to seal around enclosure 20 between the two housing elements. In accordance with conventional compass practice, enclosure 20 is filled with a transparent liquid which can be introduced via a fill-passage 46 which is subsequently closed by a filler screw and O-ring seal 48. With this arrangement, lamp 42 shines unpolarized light onto polarizing disc 34. As it passes through disc 34, the light is polarized by the disc so that only polarized light shines through window 28 and hole 30 into analyzing enclosure 22. Since magnet 36 tends to align compass disc assembly 24 with the direction of the prevailing external magnetic field (e.g., the north magnetic pole in the northern hemisphere), the direction of polarization of the light entering analyzing enclosure 22 with respect to axis 26a is indicative of the direction of the external magnetic field with respect to axis 26a.

As best seen in FIG. 1, an analyzing disc assembly 50 is supported within enclosure 22 for rotation about an axis 52 which is offset with respect to axis 26a. Analyzing assembly 50 comprises an analyzing disc 54 having a circular outer periphery which is girdled by a rubber tire 56. Assembly 50 is supported in a plane perpendicular to axis 54 and axis 26a by means of three circumferentially spaced rollers 58, 60 and 62 shaped to engage tire 56. The three rollers are supported on housing element 16 with rollers 58 and 60 being idler rollers while roller 62 is a drive-roller operatively coupled with a rotary thumb-wheel 64 located below the housing. Analyzing disc 54 comprises a central circular polarized region 54a and an outer annular polarized region 54b which has a circular inner periphery matching the circular periphery of region 54a. The two polarized regions 54a and 54b are arranged to have their directions of polarization at an angle to each other, preferably at a right angle. A pair of photo-responsive elements 66 and 68, preferably cadmium sulphide photo cells, are mounted in housing element 16 directly beneath analyzing disc 54. Photo cell 66 is positioned directly beneath central polarized region 54a and is preferably axially aligned therewith. Photo cell 68 is positioned directly along side photo cell 66 and directly beneath a portion of outer polarized region 54b. Each photo cell 66 and 68 has a photo-responsive region which is responsive to light incident thereon over a limited solid angle. Photo cells 66 and 68 are positioned with respect to analyzing disc 54 that only polarized light passing through central polarized region 54a falls within the light-sensitive solid angle to which photo cell 66 is responsive and only light passing through outer polarized region 54b falls within light-sensitive solid angle to which photo cell 68 is responsive, in this way, photo cell 68 is insensitive to any light which may be scattered from central polarized region 54a while photo cell 66 is totally insensitive to any scattered light which may be from outer polarized region 54b. In other words, photo cells 66 and 68 are "optically isolated" from each other, but without the necessity of using light shields or optically collimated light beams. The invention thereby provides a significant performance improvement with greater accuracy without complexity. Furthermore, the side-by-side spacing of photo cells 66 and 68 minimizes the radial dimension of the unit. Photo cells 66 and 68 are operatively coupled in an electrical circuit schematically shown in FIG. 2. This circuit includes a potentiometer 70, an amplifier 72 and a resistor 74. Photo cells 66 and 68 are connected in series with each other across a power supply, illustrated as an 8-volt potential, while potentiometer 70 is also coupled across this power supply. The wiper of potentiometer 70 connects to one input of amplifier 72 and the junction of photo cells 66 and 68 connects to the other input of amplifier 72. Thus, a bridge circuit is provided for the input of amplifier 72. The resistor 74 forms a feed-back path between the output 72a of amplifier 72 and the input of amplifier 72 to which the photo cells are connected. For equal intensities of light falling on photo cells 66 and 68 potentiometer is adjusted to bring the output of amplifier 72 to a reference level, which is illustrated by way of example in FIG. 3 as being 4 volts. With the polarized regions 54a and 54b being at right angles to each other, equal intensity of light can be shone on the two photo cells by orienting the analyzing disc via thumb wheel 64 so that the regions 54a and 54b are each at a 45° angle with respect to the polarized light incident thereon from polarizing disc 34. Let this position be referred to as the "0°" reference position. Should the orientation of the housing with respect to the magnetic compass disc assembly 24 begin to change in one direction away from the 0° reference position, then a greater amount of light will fall on one of the photo cells and a lesser amount on the other photo cell. Accordingly, the output signal developed by amplifier 72 will change in a manner indicative of the amount of rotation of analyzing disc 54 relative to polarizing disc 34. In FIG. 3 the graph plot 76 illustrates the output voltage developed by amplifier 72 as a function of the relative displacement between the discs 34 and 54 away from the 0° reference position. The abscissa of graph plot 76 represents relative angular displacement of the two discs away from the 0° reference position and the ordinate represents the magnitude of the output voltage developed by amplifier 72. Graph plot 76 is of sinusoidal shape about the 4-volt reference level, varying between 3 and 5 volts and repeating for every 180° of revolution of polarizing disc 34 relative to analyzing disc 54. It has been found that with the present arrangement a high degree of accuracy can be attained without the need to use more complicated optical techniques and without the need to use more sophisticated electronic circuitry. Illustratively, angular changes of less than 0.02° can be detected at amplifier output 72a. Furthermore, the graph plot 76 indicates a sufficient degree of linearity about the 0° reference position that a linearizing system for the electronics to compensate for the sinusoidal characteristic of the graph plot is typically unnecessary. Thus, in an autopilot system, the present invention minimizes construction complexity.

Apart from the improved accuracy, a magnetic heading reference embodying the principles of the present invention possesses the following advantages. Photo cell 66 can be positioned in direct axial alignment with central polarized region 54a of analyzing disc 54. Both photo cells 66 and 68 can be positioned side-by-side and disposed on diametrically opposite sides of the axis 26a. This means that the radial dimension is limited only by the physical dimensions of the respective photo cells 66 and 68. Accordingly, the unit can be made compact in the radial direction, if desired. Furthermore, note that the axis about which analyzing disc 54 rotates can be offset with respect to the axis of the polarizing disc. The thumb-wheel positioning means for positioning analyzing disc 54 is especially useful when applied to a magnetic heading reference since it permits convenient adjustment of the unit. Although the photo cells 66 and 68 are preferably closely spaced together in order to minimize the radial dimensions of the unit, it is not essential that such orientation of the photo cells be provided. The present invention, though the recognition of the translational invariance property of polarized light, provides further advantages to a magnetic heading reference embodying principles of the present invention. In view of this translational invariance property, it is not essential that the two photo cells be placed side-by-side since the radius at which the photo cells are located relative to axis 26a is theoretically irrelevant. Polarizing disc 34 can be constrained within its enclosure in any fashion so long as the direction of polarization of the polarized light incident on the analyzing disc is representative of the horizontal component of the prevailing external magnetic field. Hence, various mounting arrangements for a magnetic compass disc are possible, such as the jewel and pivot arrangement illustrated in the drawing which permits the polarizing disc to tilt in any direction while maintaining alignment with the horizontal component of the prevailing external magnetic field. Thus, even with the disclosed or other mounting arrangements of the polarizing disc, a magnetic heading reference in accordance with the present invention maintains accuracy in response to relative angular displacement between the analyzing and polarizing discs. This is especially advantageous in an auto-pilot system. Thus, it can be seen that a magnetic heading reference embodying principles of the present invention affords important advantages and benefits over the prior art.

FIG. 4 illustrates a further application of polarized light system according to the present invention in a torque meter. In FIG. 4 similar components from the preceding figures are identified by like numerals and, hence, need not be described in detail. In FIG. 4 the polarizing system has polarizing disc 34 and analyzing disc 54 affixed to a shaft 78 which includes a torsion spring shaft portion 78a, intermediate discs 34 and 54. Torsion in shaft 78 is measured in terms of the angular displacement or twist in torsion spring shaft portion 78a. Because photo cells 66 and 68 are disposed directly behind analyzing disc 54, the two photo cells are optically isolated from each other thereby improving the accuracy of the system. Furthermore, the use of the electronic bridge circuit further improves the performance of the torque meter by rendering the torque measurement insensitive to variations in the intensity of lamp 42 and also changes in the characteristics of the photo cells due to aging or temperature variation. If desired, a light shield such as 80 can surround the meter to prevent intrusion of ambient light.

While it will be apparent that the preferred embodiment of the invention disclosed is well calculated to fulfill the objects above stated, it will be appreciated that the invention is susceptible to modification, variations and change without departing from the spirit thereof.

What is claimed is:

1. Means for detecting relative angular displacement comprising: a source of unpolarized light; polarizing means disposed in the path of light from said source to cause the light passing therethrough to be polarized; analyzing means disposed in the path of said polarized light comprising a central polarized area and an outer polarized area surrounding said central polarized area, said central and outer polarized areas being arranged to have their respective directions of polarization at an angle to each other; a first photo-responsive means positioned to receive the light which first passes through said polarizing means and then through said central polarized area of said analyzing means; and a second photo-responsive means positioned to receive the light which first passes through said polarizing means and then through said outer polarized area of said analyzing means; said analyzing means and said polarizing means being angularly displaceable relative to each other.

2. Means for detecting relative angular displacement as claimed in claim 1 wherein said polarized light is arranged to radiate in substantially equal intensity in the directions of said first and second photo-responsive means.

3. Means for detecting relative angular displacement as claimed in claim 1 wherein the respective directions of polarization of said central and outer polarized areas are arranged at right angles to each other.

4. Means for detecting relative angular displacement as claimed in claim 1 further including electrical circuit means operatively associated with said first and second photo-responsive means, said first and second photo-responsive means providing respective output signals each respresentative of the amount of light incident on the corresponding photo-responsive means, said electrical circuit means providing a further signal indicative of the differential between said output signals.

5. Means for detecting relative angular displacement as claimed in claim 1 further including positioning means for angularly positioning said analyzing means with respect to said polarizing means.

6. Means for detecting relative angular displacement as claimed in claim 5 wherein said analyzing means lies in a plane and said positioning means is arranged to rotate said analyzing means in said plane.

7. Means for detecting relative angular displacement as claimed in claim 6 wherein said means for detecting relative angular displacement operates to detect angular displacement of a first member relative to a second member, said polarizing means being affixed to said first member and said analyzing means being affixed to said second member, said first member having a center of rotation and said second member having an axis of rotation which offset from the center of rotation of said first member.

8. Means for detecting relative angular displacement as claimed in claim 7 wherein said central polarized area of said analyzing means has a circular outer edge and said first and second members are arranged such that an imaginary line passing through said center of rotation perpendicular to the plane of said analyzing means intersects said plane at a point on said circular outer edge of said central polarized area.

9. Means for detecting relative angular displacement as claimed in claim 1 wherein said central polarized area of said analyzing means has a circular outer edge.

10. Means for detecting relative angular displacement as claimed in claim 9 wherein said polarizing means has a center of rotation and said analyzing means and said polarizing means are arranged such that an imaginary line passing through said center of rotation perpendicular to said analyzing means intersects a point on said circular outer edge of said central polarized area of said analyzing means.

11. Means for detecting relative angular displacement as claimed in claim 10 further including positioning means for angularly positioning said analyzing means about an axis parallel to said line.

12. Means for detecting relative angular displacement as claimed in claim 11 wherein said first photo-responsive means is disposed in substantial axial alignment with said central polarized area.

13. Means for detecting relative angular displacement as claimed in claim 13 wherein said first photo-responsive means is disposed immediately behind said central polarized area on the side of said analyzing means opposite said polarizing means.

14. Means for detecting relative angular displacement as claimed in claim 12 wherein said second photo-responsive means is disposed diametrically opposite said first photo-responsive means relative to said axis.

15. Means for detecting relative angular displacement as claimed in claim 14 wherein said first and second photo-responsive means are disposed in side-by-side fashion.

16. Means for detecting relative angular displacement as claimed in claim 15 wherein said first and second photo-responsive means are disposed immediately behind said analyzing means on the side thereof opposite said polarizing means.

17. Means for detecting relative angular displacement as claimed in claim 9 wherein said outer polarized area has a circular inner periphery matching the outer circular periphery of said central polarized area.

18. Means for detecting relative angular displacement as claimed in claim 1 wherein said first and second photo-responsive means each comprises a photo-sensitive area responsive to light incident thereon falling within a limited solid angle, said first and second photo-responsive means being positioned such that light from said source which passes through said central polarized area of said analyzing means subtends substantially the entire solid angle associated with the photo-sensitive area of said first photo-responsive means and the light from said source passing through said outer polarized area of said analyzing means subtends substantially the entire solid angle associated with the photo-senesitive area of said second photo-responsive means.

19. A magnetic heading reference comprising: a housing forming an enclosure; magnetic means disposed within said enclosure for alignment with the horizontal component of the prevailing external magnetic field; a source of unpolarized light on said housing; polarizing means carried by said magnetic means and disposed in the path of light from said source such that the light passing through said polarizing means becomes polarized and has a direction of polarization representative of the direction of said horizontal component of the prevailing external magnetic field; analyzing means on said housing disposed in the path of said polarized light, said analyzing means comprising a first region of polarization and a second region of polarization, said two regions of polarization having their respective directions of polarization at an angle to each other, a first photo-responsive means disposed on said housing to receive light which first passes through said polarizing means and then through said first region of polarization; a second photo-responsive means disposed on said housing to receive light which first passes through said polarizing means and then through said second region of polarization; and positioning means for positioning said analyzing means with respect to said housing.

20. A magnetic heading reference as claimed in claim 19 wherein said analyzing means comprises a disc containing said first and second regions of polarization, said positioning means being arranged to rotate said disc about an axis.

21. A magnetic heading reference as claimed in claim 20 wherein said magnetic means is arranged to rotate about a point and said axis is offset with respect to the point about which said magnetic means rotates.

22. A magnetic heading reference as claimed in claim 21 wherein said first region of polarization has a circular outer periphery and said second region of polarization surrounds said first region of polarization.

23. A magnetic heading reference as claimed in claim 22 wherein the periphery of said first region of polarization is substantially tangent to a line passing through the point about which said magnetic means rotates perpendicular to said axis.

24. A magnetic heading reference as claimed in claim 23 including manually operable means for operating said positioning means to rotate said disc.

25. A magnetic heading reference as claimed in claim 24 wherein said manually operable means comprises a thumbwheel knob.

26. A magnetic heading reference as claimed in claim 22 wherein said first photo-responsive means is disposed in axial alignment with said first region of polarization.

27. A magnetic heading reference as claimed in claim 26 wherein said second photo-responsive means is disposed along side said first photo-responsive means.

28. A magnetic heading reference as claimed in claim 27 wherein said first photo-responsive means is disposed to respond substantially exclusively to light passing through said first region of polarization and said second photo-responsive means is disposed to respond substantially exclusively to light passing through said second region of polarization.

* * * * *

UNITED STATES PATENT OFFICE
CERTIFICATE OF CORRECTION

PATENT NO. : 3,907,431
DATED : September 23, 1975
INVENTOR(S) : John A. McDougal It is certified that error appears in the above-identified patent and that said Letters Patent are hereby corrected as shown below:

Column 3, line 16 (Application page 6, line 1), after "accuracy" insert --yet--.

Column 3, line 19 (Application page 6, line 4), "electrical" should be --electric--.

Column 4, line 28 (Application page 8, line 10), "though" should be --through--.

Column 6, line 1 (Claim 7, line 9), after "which" insert --is--.

Column 6, line 32 (Claim 13, line 2), "claim 13" should be --claim 12--.

Column 6, line 66 (Claim 18, line 14), "senesitive" should be --sensitive--.

Signed and Sealed this twenty-third Day of December 1975

[SEAL]

Attest:

RUTH C. MASON
*Attesting Officer*

C. MARSHALL DANN
*Commissioner of Patents and Trademarks*